(12) United States Patent
Atkinson

(10) Patent No.: US 7,464,506 B2
(45) Date of Patent: Dec. 16, 2008

(54) PNEUMATIC HURRICANE SHUTTERS

(76) Inventor: Allen J. Atkinson, 1270 Covered Bridge Rd., Palm City, FL (US) 34990

( * ) Notice: Subject to any disclaimer, the term of this patent is extended or adjusted under 35 U.S.C. 154(b) by 523 days.

(21) Appl. No.: 10/949,765

(22) Filed: Sep. 24, 2004

(65) Prior Publication Data
US 2006/0070305 A1 Apr. 6, 2006

(51) Int. Cl.
*E04G 11/04* (2006.01)
*E06B 3/26* (2006.01)

(52) U.S. Cl. ............... 52/202; 52/2.11; 52/2.14; 52/2.24

(58) Field of Classification Search .......... 52/202, 52/203, 2.11, 2.13, 2.14, 2.18, 2.19, 2.24, 52/2.25, 167.1; 49/477.1
See application file for complete search history.

(56) References Cited

U.S. PATENT DOCUMENTS

| 3,809,144 | A |   | 5/1974  | Garufo |
| 3,881,686 | A | * | 5/1975  | Hirmann ............ 251/61.1 |
| 3,911,630 | A |   | 10/1975 | Nally |
| 4,040,210 | A | * | 8/1977  | Land ............... 52/2.12 |
| 4,098,035 | A |   | 7/1978  | Bessler |
| 4,114,325 | A | * | 9/1978  | Hochstein ........... 52/2.21 |
| 4,255,907 | A |   | 3/1981  | Lightell |
| 4,255,908 | A |   | 3/1981  | Rosenberg |
| 4,262,045 | A |   | 4/1981  | Chen et al. |
| 4,506,720 | A |   | 3/1985  | Iwanicki |
| 4,629,433 | A | * | 12/1986 | Magid ............... 441/40 |
| 5,140,768 | A |   | 8/1992  | Forbes |
| 5,937,595 | A |   | 8/1999  | Miller |
| 6,086,128 | A |   | 7/2000  | Whitehead, Sr. |
| 6,266,926 | B1 |  | 7/2001  | Figge et al. |
| 6,898,907 | B2 | * | 5/2005 | Diamond ............ 52/202 |
| 2002/0184841 | A1 | | 12/2002 | Diamond |

* cited by examiner

*Primary Examiner*—Jeanette Chapman
*Assistant Examiner*—Elizabeth A Plummer

(57) ABSTRACT

Pneumatic hurricane shutters are designed to temporarily cover a window or door in a building or other structure. The shutters have a lightweight rigid frame for surrounding the openings and mounting on fasteners attached to the building. Elongated pneumatic tubes are connected to frame rails and span the space between the rails to protect the opening. The frames can be locked in place to prevent inadvertent removal once in place. The frames and deflated tubes can be stored until the approach of a storm at which time the frames may be attached to the building and the tubes inflated to protect the openings.

3 Claims, 6 Drawing Sheets

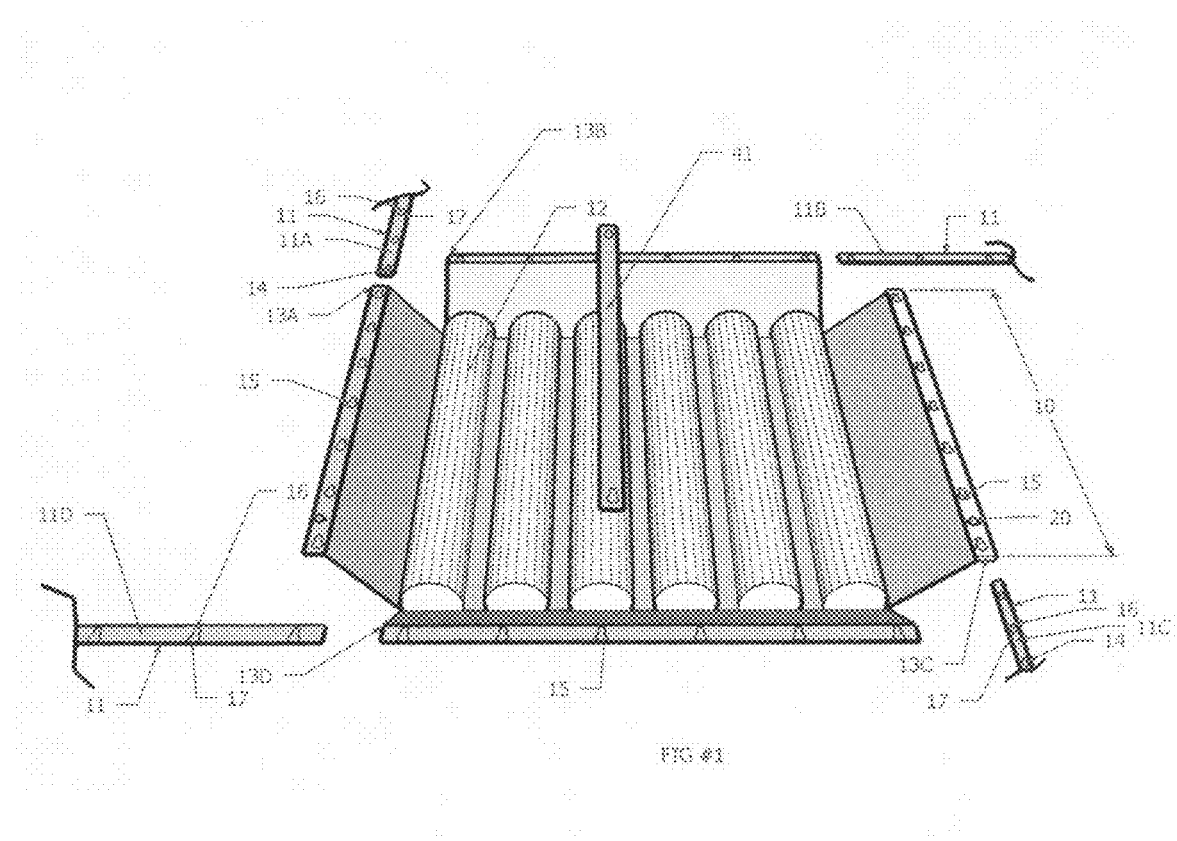
FIG #1

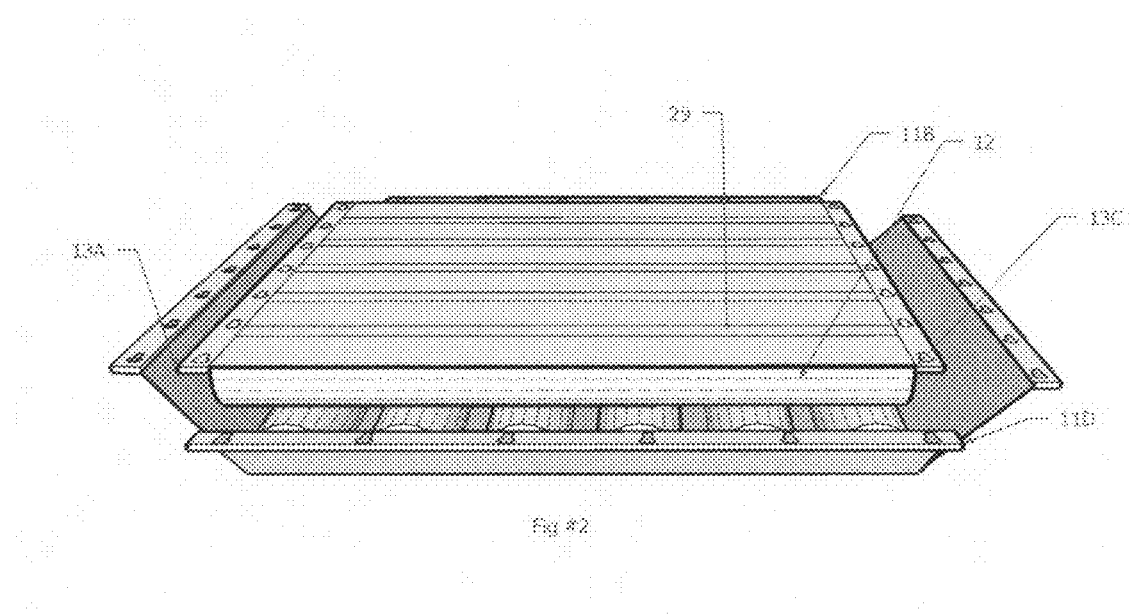

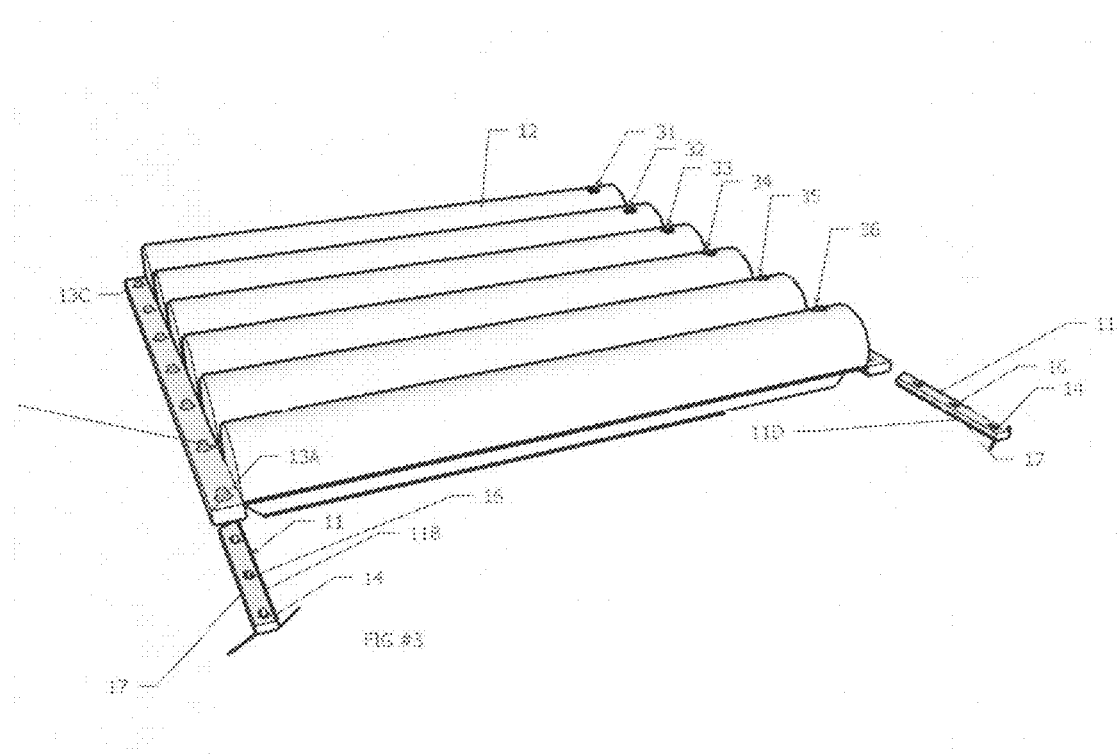

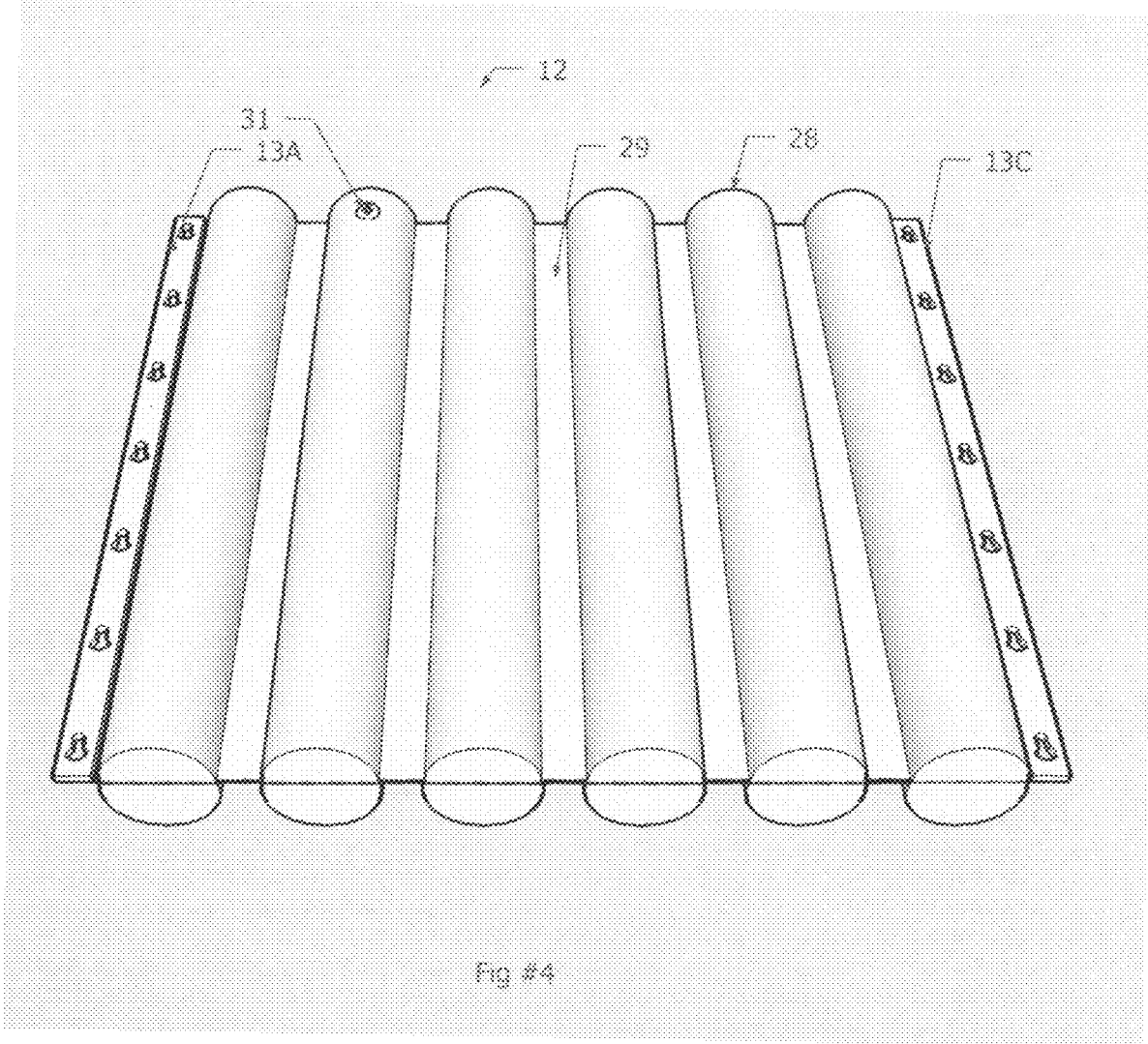
Fig #4

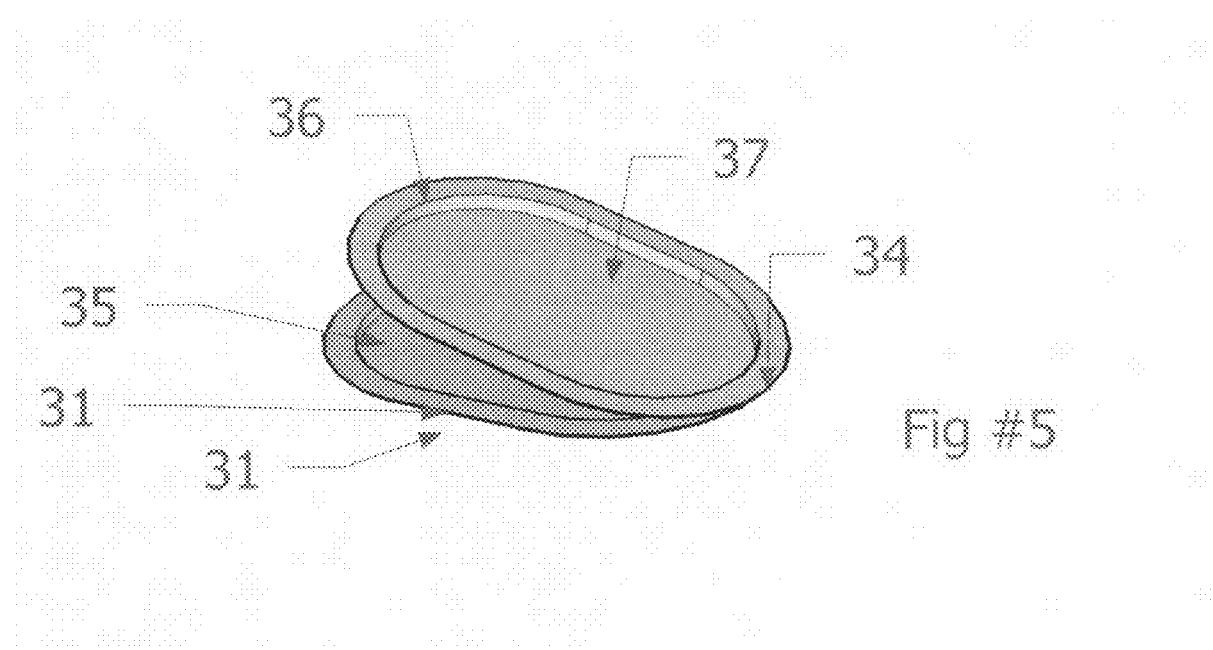

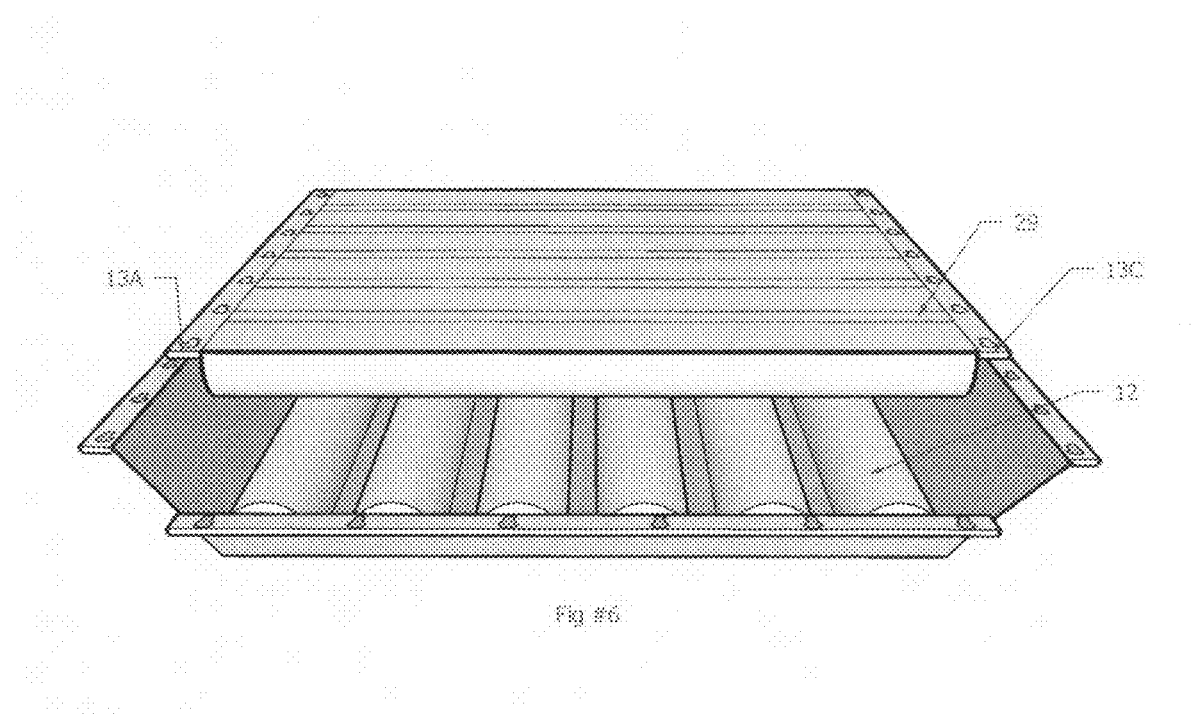

PNEUMATIC HURRICANE SHUTTERS

BACKGROUND OF THE INVENTION

1. Field of the Invention

This invention relates to temporary protective barriers used to protect buildings and their contents from the effects of high velocity winds and the associated debris.

2. Description of the Prior Art

As is known by one skilled in the art of protecting buildings and the like from damage caused by missile-like objects that are occasioned by heavy winds such as tornadoes and hurricanes, there are commercially available variations of hurricane protective devices, often called shutters, that fasten immediately over the frangible area to be protected.

Conventional hurricane shutters are typically expensive to purchase, cumbersome, made from stiff, heavy material such as steel and aircraft quality aluminum alloy or occasionally reinforced plastic. Many shutters need to be manually connected and then removed and stored at each threat of inclement weather. Many others require unsightly and difficult-to-mount reinforcing bars at multiple locations. Further, these known shutters are usually opaque, preventing light from entering a shuttered area and preventing an inhabitant from seeing out. Likewise, it is desirable that police be able to see into buildings to check for inhabitants and to prevent looting which can be a problem in such circumstances. Missiles, even small not potentially damaging missiles, striking these heretofore known shutters create a loud, often frightening noise that is disturbing to inhabitants being protected.

There are also a number of patents directed to the use of knitted or woven fabric such as netting, tarpaulins, drop cloths, blankets, sheets, wrapping and the like for anchoring down recreational vehicles.

Other protective coverings using an inflated barrier are known, as shown by Figge et al, U.S. Pat. No. 6,266,926 B1; Lightell, U.S. Pat. No. 4,255,907; Miller, U.S. Pat. No. 5,937, 595; Nally, U.S. Pat. No. 3,911,630; and Bessler, U.S. Pat. No. 4,098,035. However, these devices lack a defined frame for maintaining the inflatable barrier in the proper orientation and for secure attachment to a building.

What is needed in the art is a lightweight, wind, rain and debris protective system, for individual openings, that can be stored in minimal space and quickly installed to protect openings in structures.

SUMMARY OF THE PRESENT INVENTION

The present pneumatic hurricane shutters are formed from a lightweight rigid frame for surrounding the openings in a building such as a doorway and window. Elongated pneumatic tubes are connected to the frame rails and span the space between the rails to protect the opening. The frames and deflated tubes can be stored until the approach of a storm at which time the frames may be attached to the building and the tubes inflated to protect the openings.

The frames are adapted to be securely and removably attached to a surface of a structure about an opening, usually bolts embedded in the structure. The frame includes at least two rails, one of the rails adapted to be disposed on one side of an opening and the other rail adapted to be disposed on an opposite side of the same opening. The frame includes a fastening means for attaching the frame to the structure to support a plurality of elongated pneumatic tubes extending across the frame and inflated to fill the space within the frame.

Therefore, an objective of this invention is to provide a hurricane shutter with an inflatable barrier supported by a frame attachable to a building.

It is another objective of this invention to provide a frame with fastening devices for cooperation with mounting devices located on the structure to removably fix the shutter on a structure covering an opening in the structure. A lock is included in the frame to prevent inadvertent removal of the shutter.

It is a further objective of this invention to provide an inflatable barrier connected to the frame to increase the resilience of the barrier.

It is a still further objective of this invention to provide a second set of fastening means on the inflatable barriers to cooperate with the frame and the mounting devices to fix the barrier in place.

It is yet another objective of the invention to provide a valve in the inflatable barrier for semi-rigid inflation and deflation for storage.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

BRIEF DESCRIPTION OF THE DRAWINGS

FIG. 1 is an exploded perspective of the pneumatic barrier of this invention in place on a building;

FIG. 2 is a cross section of an alternative assembly of the invention shown in FIG. 1;

FIG. 3 is a cross section of another embodiment of the pneumatic barrier of this invention;

FIG. 4 is a cross section of another embodiment of the invention shown in FIG. 1; and FIG. 5 is a perspective of a one-way valve of this invention;

FIG. 6 is a cross section of an alternative assembly of the invention shown in FIG. 1.

DETAILED DESCRIPTION OF THE INVENTION

The pneumatic hurricane shutter 10 has a frame 11 fabricated to fit conventional windows and doors in commercial or residential buildings and pre-fabricated mobile structures. The frame rails 11a, 11b, 11c, and 11d surround and fix in place a pneumatic barrier 12 composed of a plurality of pneumatic pillows 28. The hurricane shutter may be deployed with frame rails on all sides of the opening or the frame members may only be used on opposite sides of the opening.

Of course, the pneumatic shutters 10 of this invention may be used with flush mounted windows and doors or exterior recessed windows and doors in which case the pneumatic barriers would be placed within the window or door sill and the frame would be flush with the exterior of the building. The top flange 11b extends transversely across the opening between the top of the window and the roof of the building. All of the frame members have key hole slots 14 extending through the members. Each of the key hole slots has a narrow retainer section 16 and a larger mounting section 17. The mounting section 17 is of a size to accommodate the head of a bolt or pin attached to the building.

The pneumatic shutter member 12 has a reinforced tunnel hem 13a, 13b, 13c and 13d on each edge. Each of the hem sections have a series of key holed shaped apertures 15 spaced along the length of the hem. The spacing of the apertures 15 and the key hole slots 14 are such that the apertures and the slots will register with each other.

The registered apertures and slots are then placed over a spaced series of bolts (not shown) anchored in the building about the openings. Once all the bolt heads are placed in the registered apertures and slots, the frame 11 can be lowered to engage the retainer section 16 about the bolt shaft to fasten the frame 10 to the building. The bolts may then be tightened to secure the shutters in place. In the event the bolts are not tightened for any reason, there is a locking means to secure the shaft of the bolts in the retainer section of the key hole slots and apertures. After the bolts and slots are registered, a hole through the barrier and the frame registers with a pin or hole in the building. Insertion of the pin through the hole 20 will prevent the key hole slots and apertures from dislodging from the bolts. Alternatively, a bolt may be screwed through the hole 20 to secure the shutter in place.

The reinforcing bar 41 may be added to the shutters 10 for additional strength and security. The rigid bar has the same shaped slots as the frame members and are to be placed over the shaft of a bolt or pin extending through the shutter.

The vertical frame members 11b and 11d are shown, in FIG. 2, as deployed on the outside of the tunnel hem 13a and 13c, as a matter of choice. The frame members may be positioned between the building and the pneumatic shutter or as the outer component of the system. Also shown, in FIG. 2, is an embodiment of the pneumatic shutter 10 in which the pneumatic pillows 28 are semi-circular with a planar backing.

In FIG. 3, the pneumatic barrier 12 has a compound series of pillows 28, 28a with one set being semi-circular and oriented perpendicular to the other semi-circular set with the planar backing of each in contact with each other. This orientation provides more resilience and increases the space in which debris may be decelerated before contacting the frangible portion of the opening. The sets may be integrally made in one piece or they may be separate and added to each other, as needed. Other angular orientations may also be used between the sets. Slots 14 and registered apertures 15, between a frame member telescoped within a hem, are also shown. In FIG. 4, another modification of the pillows 28 is depicted. In this embodiment, the pillows 28 are formed as circular tubes.

The pneumatic barrier 12 is attached to the frame 11 which provides the structural support for the pneumatic barriers, both in the storage condition and when inflated and mounted on a building. This allows each shutter to be easily handled as a discrete unit with mounting requiring only matching the key hole slots with the bolts in the building. The frames and the deflated pneumatic pillows may be stored in minimal space. Once the frames are in place, the pneumatic barriers can be inflated for protection.

The pneumatic barrier pillows 28, as shown, are composed of a series of inflatable tubes. The shape of the inflated portion of the pillows may have different designs, such as, octagonal, circular, zig-zag, etc. The tubes 28 are preferably connected with each other by a web 29 that combines the tubes into a unitary whole. The tubes and the web may be made from a multi-layered laminate with the web formed by sealing the multi-layered material together and the tubes being the non-sealed areas. A conduit can also be formed in the web connecting all the inflatable tubes, with the open end of the conduit having a one-way valve for inflation and deflation. The conduit may also include a pressure relief valve, well known in the art of pneumatic devices, for preventing overpressurization of the barriers. The web 29 has margins extending beyond the tubes and forming the hems 13a, 13b, 13c and 13d. The margins can be connected to the frame 10 by bonding or other adhesive application. The material of the pneumatic barriers is preferably flexible but non-extensible to create a semi-rigid structure when inflated. Stiff polymers, such as KEVLAR, polypropylene, NYLON, or other laminates having a non-extensible layer, such as polyurethane films with intermediate lamina of woven mat, may be used along with any other material having the requisite properties. It is also desirable for the pneumatic barriers to be transparent or opaque.

The tubes 28 may have individual inflation valves 31, 32, 33 with the interior of each tube segregated from the other tubes. This provides an extra measure of safety since a puncture in one tube will not allow complete deflation of the pneumatic barrier 12. As mentioned above, the tubes may be connected by a conduit for inflating all the tubes through a common inflation valve.

The valves 31, 32, and 33 are one way valves which may be made of polymers. The valves, as shown in FIG. 5, have a flat valve body 34 bonded about an aperture in the pneumatic tube. The valve body has an inlet 35 connecting the interior of the tube with the atmosphere. A flap valve 36 closes the inlet 35 and is attached to the valve body forming a hinge 37. The hinge 37 is biased flat or closed and the flap pivots into the interior of the tube so that inflation pressure will hold the valve closed. The valve may be opened by a probe to allow deflation, when desired. Other valve may be used, such as provided for inflatable footballs, soccer balls, basketballs, or tire valves.

It is of importance that the material affords sufficient impact protection to meet the regulatory agencies' requirements in order for this to be a viable alternative to other hurricane protective mechanisms. While stiff structures, such as panels of metal, are easily tested for impact requirement and have certain defined standards, pneumatic barriers on the other hand, are flexible and react differently from stiff structures. Hence the testing thereof is not as easily quantified as the stiffer materials. However, certain empirical relationships exist so that correlation can be made to compare the two mediums. Typically, the current impact test of certain locales requires a wood 2×4 stud be shot at the barrier exerting a total force of approximately 230 pounds, or 61.3 pounds per square inch (psi), over its frontal (impacting) surface of 3.75 square inches.

The preferred embodiment of this invention would use a polymer tube having at least a burst pressure above the force exerted by the nominal 2×4 test missile. Without being held to the theory expressed here, the tubes respond somewhat akin to a hydraulic piston in that the 61.3 psi applied over a 3.75 square inch surface of the 2×4 (first piston) on the outside of the inflated tube is transferred to the total interior surface area of the tube (second piston) which is in contact with the window. For example, a standard window is approximately 2 feet wide and 3 feet high. The pneumatic tubes would be approximately 3 feet long. The diameter of the tubes is approximately 7 inches. The area in contact with the window, at impact, would be approximately 252 square inches which reduces the impact on the window to approximately 1 psi. The area at impact accounts for the compression of the air in the tubes and deformation of the tube against the window. Not only is the impact force reduced but the application of that force is spread evenly over the length and width of the tube. Obviously, the diameter of the pneumatic tubes would affect the transferred force and the diameter can be adjusted for different expected impacts.

The discretionary use of additional sets of barriers, as illustrated in FIG. 6, adds flexibility to the system in that the reduced force transferred by the tubes is further reduced and spread by the entire surface of the mattress.

A number of embodiments of the present invention have been described. Nevertheless, it will be understood that various modifications may be made without departing from the spirit and scope of the invention. Accordingly, it is to be understood that the invention is not to be limited by the specific illustrated embodiment but only by the scope of the appended claims.

What is claimed is:

1. A hurricane shutter for temporarily covering an opening in a structure for preventing incursion of high wind and debris carried thereby comprising a rigid frame, said frame having a top rail, a bottom rail, a first side rail and a second side rail, said first side rail, said second side rail, said top rail and said bottom rail adapted to be connected to a building, said frame adapted to surround an opening in a building, said top rail, said bottom rail, said first side rail and said second side rail including apertures adapted to mate with fasteners in said building to securely and removably connect said frame to a structure, a reinforcing bar extending between said first side rail and said second side rail intermediate the length of said first side rail and said second side rail, said reinforcing bar removably connected to said first side rail and said second side rail, at least one of said top rail, said first side rail and said second side rail includes a lock for attaching said frame to said building to prevent inadvertent removal, a plurality of elongated pneumatic tubes extending between said first side rail and said second side rail, said plurality of elongated pneumatic tubes connected together by a web, said web connected to said frame, said plurality of elongated pneumatic tubes having an inflation valve whereby said plurality of elongated pneumatic tubes may become semi-rigid.

2. A hurricane shutter of claim 1 wherein a second pneumatic body contacts said plurality of elongated pneumatic tubes, said second pneumatic body disposed between said plurality of elongated pneumatic tubes and the opening, said second pneumatic body having a peripheral edge, said edge approximately coterminous with said plurality of elongated pneumatic tubes.

3. A hurricane shutter of claim 2 wherein said peripheral edge of said second pneumatic body connected to said frame.

* * * * *